Nov. 18, 1941.   F. BOLOG   2,263,285

TRANSFER ROLLER

Filed June 24, 1939

INVENTOR.
FRANK BOLOG
BY
ATTORNEY.

Patented Nov. 18, 1941

2,263,285

UNITED STATES PATENT OFFICE 2,263,285

TRANSFER ROLLER

Frank Bolog, Detroit, Mich.

Application June 24, 1939, Serial No. 281,033

3 Claims. (Cl. 91—67.8)

Transfer rollers now in general use have not proved entirely satisfactory, due primarily to loss in resilient property after a very short period of service. This loss of resilience is especially affected by high temperatures and invariably destroys the efficiency of the roller. The present invention aims to overcome this difficulty.

An object of the invention is to provide a transfer roller so constructed that it may retain its resilient property over a long period of time.

Another object of the invention is to provide a transfer roller having all of the advantages of the conventional gelatin roller now in universal use without the shrinkage and resultant distortion inherent in gelatin rollers.

Another object of the invention is to provide a composite transfer roller including a thin gelatin coating on a relatively thick resilient base so as to enhance the effectiveness thereof.

A further object of the invention is to provide a transfer roller including a gelatin surface of a composition having a high melting point.

Other objects and advantages of the invention will appear from the following description taken in connection with the drawing, and in which.

Figure 1:
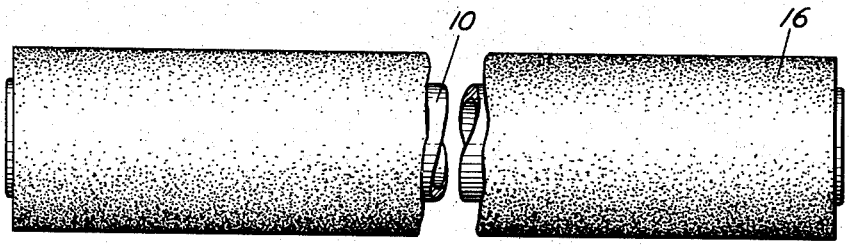
Fig. 1 is a side elevation of a transfer roller.
Figure 2:
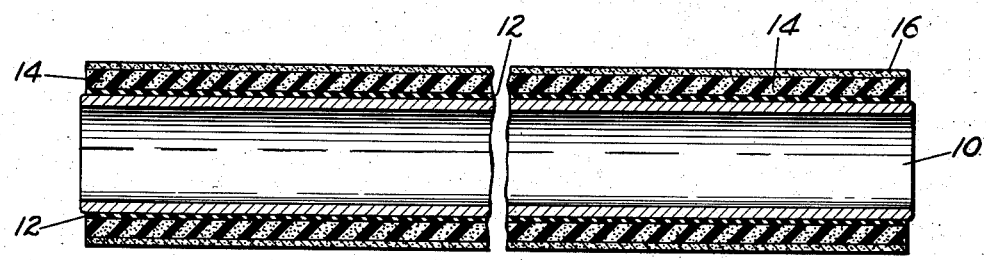
Fig. 2 is a longitudinal sectional view.

Referring to the drawing for more specific details of the invention, 10 represents a metallic mandrel, preferably hollow. The mandrel is coated with a suitable binder 12, as, for example, rubber cement, and slipped over the mandrel is a sponge rubber jacket or sleeve 14. The wall of the jacket has a substantial thickness, and a relatively thin coating of gelatin 16 is molded on the jacket.

In the manufacture of the roller, a mandrel is coated with rubber cement, and before the cement sets a sponge rubber jacket is sleeved on the mandrel. The roller thus far built is then centered in a rotatable cylindrical mold, pre-heated in a water bath of approximately 210° F. The mold is of such a size that upon receiving the roller there is provided an annular chamber between the sponge rubber jacket and the wall of the mold. The space between the circumference of the sponge rubber jacket and the wall of the mold is approximately one-sixteenth to one-eighth of an inch.

After centering the roller in the mold, the annular chamber, or the space between the circumference of the sponge rubber jacket and the wall of the mold, is filled with a gelatin composition previously prepared. The gelatin may be compounded in accordance with any one of a number of well-known formulas now in general use for compounding gelatin for use in the production of transfer rolls; however, a composition including gelatin and glue having a high melting point is preferred.

Immediately upon filling the annular chamber, or the space between the rubber jacket and the wall of the mold, with gelatin, the mold is rotated on its axis at a speed of approximately 30 R. P. M. for a period of from one to two minutes, so as to expel any air bubbles that may be present in the gelatin. The mold, including the roller therein, is then transferred to a cold tank and allowed to cool, and when cooled to the temperature of the tank the mold is opened and the transfer roller removed.

Figure 3:
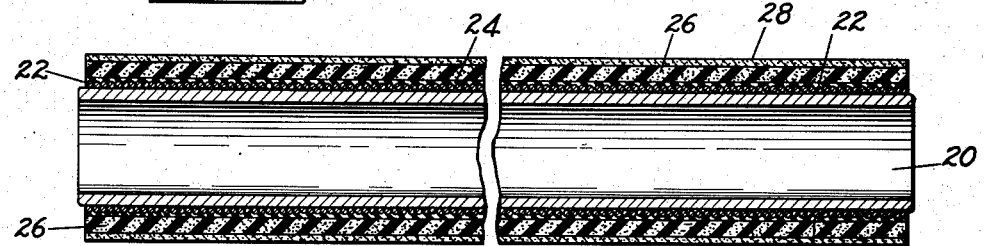
Fig. 3 is a modification of the invention.

A modification of the invention is illustrated in Fig. 3. In this modification a mandrel 20 has wound thereon under tension a cord 22. The cord is impregnated with a binder, preferably rubber cement 24, and sleeved on the mandrel over the cord is a sponge rubber jacket 26. The wall of the jacket has a substantial thickness, and a relatively thin coating of gelatin 28 is molded on the sponge rubber jacket as in the preferred embodiment of the invention.

Figure 4:
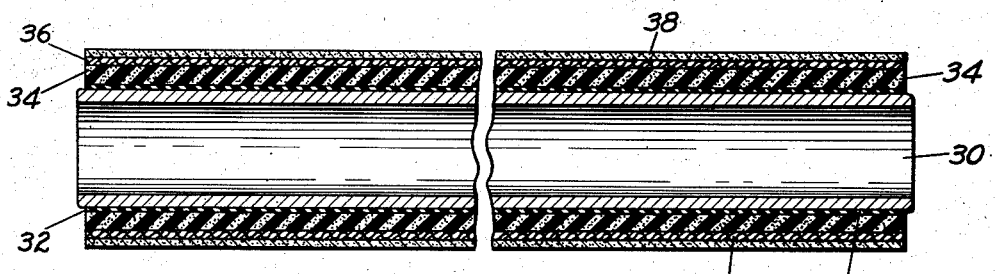
Fig. 4 is another modification of the invention.

Another modification of the invention is illustrated in Fig. 4. In this modification a mandrel 30 has thereon a coating of suitable cement 32, and sleeved over the mandrel is a sponge rubber jacket 34, and over this jacket is a thin fabric sleeve 36, and molded on this sleeve is a thin coating of gelatin.

While this invention has been described in connection with certain specific embodiments, the principle involved is susceptible of numerous other applications that will readily occur to persons skilled in the art. The invention is, therefore, to be limited only as indicated by the scope of the appended claims.

I claim:

1. The method of producing a transfer roller comprising coating a mandrel with a binder, slipping a sleeve of sponge rubber on the coated mandrel, and covering the sleeve with gelatin.

2. The method of producing a transfer roller comprising winding a cord on a mandrel, coating the cord with a binder, slipping a sponge rubber sleeve over the coated cord, and casting a gelatin coating on the sponge rubber sleeve.

3. The method of producing a transfer roller comprising winding a cotton cord on a mandrel under tension, coating the cord with a binder, slipping a sponge rubber sleeve over the coated cord, and casting a coating of gelatin on the fabric.

FRANK BOLOG.